United States Patent [19]

Sasa et al.

[11] Patent Number: 5,080,405
[45] Date of Patent: Jan. 14, 1992

[54] CORRUGATED PIPE COUPLING

[75] Inventors: Takeya Sasa; Yoshikazu Kobayashi, both of Tokyo, Japan

[73] Assignee: Nitto Kohki Co., Ltd., Japan

[21] Appl. No.: 550,688

[22] Filed: Jul. 10, 1990

[51] Int. Cl.⁵ .............................. F16L 37/18
[52] U.S. Cl. .................. 285/315; 285/318; 285/351; 285/358; 285/903
[58] Field of Search .............. 285/903, 331, 358, 318, 285/315, 351

[56]    References Cited
U.S. PATENT DOCUMENTS

| 2,129,704 | 9/1938 | Meyer | 285/318 X |
| 3,934,902 | 1/1976 | NcNamee | 285/903 X |
| 4,606,564 | 8/1986 | Kurachi | 285/318 X |
| 4,630,850 | 12/1986 | Soka | 285/903 X |
| 4,674,775 | 6/1987 | Tajima et al. | 285/903 X |
| 4,904,002 | 2/1990 | Sasa et al. | 285/316 |
| 4,907,830 | 3/1990 | Sasa et al. | 285/91 |

Primary Examiner—Dave W. Arola
Attorney, Agent, or Firm—Nixon & Vanderhye

[57] ABSTRACT

A pipe coupling for a corrugated pipe, comprises a pipe coupling main body including a cylindircal portion having a small-diameter through hole, a pipe coupling main cylindrical portion having a large-diameter through hole, a connecting stepped portion formed between the small- and large-diameter through holes and having a circumferential groove, a stopper formed in the connecting stepped portion, for locking an end portion of a corrugated pipe, and a seal ring fitted in the. circumferential groove, an inner cylinder including a through hole having a diameter substantially equal to an outer diameter of the corrugated pipe and an annular groove having a tapered surface and formed in an inner wall of a deep portion of the through hole, the inner cylinder being slidably and rotatably fitted in the large-diameter through hole of the pipe coupling main body, and a metal ring arranged in the circumferential groove of the inner cylinder and expandable in a circumferential direction thereof.

5 Claims, 6 Drawing Sheets

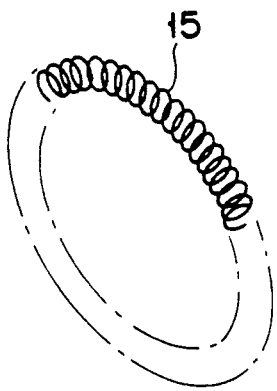
F I G. 7
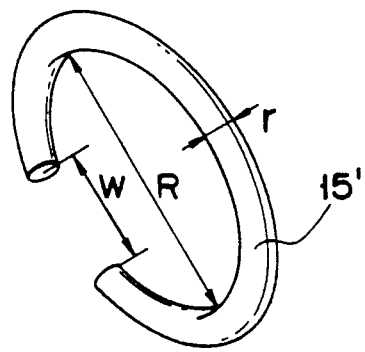
F I G. 8

CORRUGATED PIPE COUPLING

BACKGROUND OF THE INVENTION

1. Field of the Invention

The present invention relates to a pipe coupling used to connect a corrugated pipe.

2. Description of the Related Art

Recently, corrugated pipes which are easy to install have been increasingly used as various types of band materials, such as indoor gas pipe materials, in place of elbows and straight pipes. Under these circumstances, demand has arisen for new pipe couplings for connecting corrugated pipes to other types of pipes. Corrugated pipe have corrugated surfaces and hence are difficult to connect as compared with straight pipes. For this reason, conventional pipe couplings for connecting corrugated pipes inevitably have complicated internal mechanisms.

Since the conventional pipe couplings have complicated connecting mechanisms, they are difficult to handle and are poor in workability.

SUMMARY OF THE INVENTION

It is an object of the present invention to provide a pipe coupling which can reliably connect a corrugated pipe, prevents removal of the corrugated pipe and fluid leakage, and allows easy connection/fixing of the corrugated pipe.

In order to achieve the above object, according to the present invention, there is provided a pipe coupling for a corrugated pipe, comprising:

(a) a pipe coupling main body including
- a cylindrical portion having a small-diameter through hole,
- a pipe coupling main cylindrical portion having a large-diameter through hole,
- a connecting stepped portion formed between the small- and large-diameter through holes and having a circumferential groove.
- a stopper formed in the connecting stepped portion, for locking an end portion of a corrugated pipe, and
- a seal ring fitted in the circumferential groove;

(b) an inner cylinder including a through hole having a diameter substantially equal to an outer diameter of the corrugated pipe and an annular groove having a tapered surface and formed in an inner wall of a deep portion of the through hole, the inner cylinder being slidably and rotatably fitted in the large-diameter through hole of the pipe coupling main body; and (c) a metal ring arranged in the annular groove of the inner cylinder and expandable in a circumferential direction thereof, so that the corrugated pipe is elastically deformed by an urging force of the tapered surface through the metal ring when the pipe coupling main body is completely coupled to the inner cylinder, and fluid leakage is prevented by the seal ring.

According to the pipe coupling of the present invention, when the inner cylinder fitted in the large-diameter through hole of the pipe coupling main cylindrical portion is rotated, the inner cylinder is moved forward or backward in the axial direction. When a corrugated pipe is to be connected, the inner cylinder is rotated and moved in a direction to be separated from the small-diameter through hole of the pipe coupling main cylindrical portion. In this state, the corrugated pipe is inserted into the inner cylinder until its end portion is brought into contact with the stopper. In the process of this insertion of the corrugated pipe, the ring fitted in the annular groove formed in the inner surface of the inner cylinder is expanded by ridged portions of the corrugated pipe in the centrifugal direction and slips in furrowed portions.

When the inner cylinder is rotated and moved toward the small diameter through hole, the ring is urged by the tapered surface continuous with the annular groove so as to be moved in a direction perpendicular to the tapered surface and be engaged with a furrowed portion of the corrugated pipe. When the inner cylinder is further moved, the ring engaged with the furrowed portion of the corrugated pipe is moved toward the deep portion of the pipe coupling by an urging force from the tapered surface. As a result, a corrugation (corrugated surface) of the corrugated pipe whose end portion is locked by the stopper is depressed by the moving ring in the axial direction, and the end portion is more firmly locked by the stopper. In addition, the furrowed portion of the corrugated pipe is more firmly locked by the ring, thus preventing removal of the corrugated pipe from the inner cylinder. With this, the connection of the corrugated pipe is completed. At this time, the outer surface of the corrugated pipe is subjected to so-called side-surface sealing by means of the seal ring.

When the inner cylinder is rotated in the reverse direction to be moved backward in this connecting state of the corrugated pipe, the urging force of the tapered surface against the ring is reduced to release the ring. When the ring is completely released, the corrugated pipe can be pulled off from the pipe coupling.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a perspective view of a metal ring;

FIG. 8 is a perspective view of another metal ring;

DETAILED DESCRIPTION OF THE PREFERRED EMBODIMENTS

Figure 1:
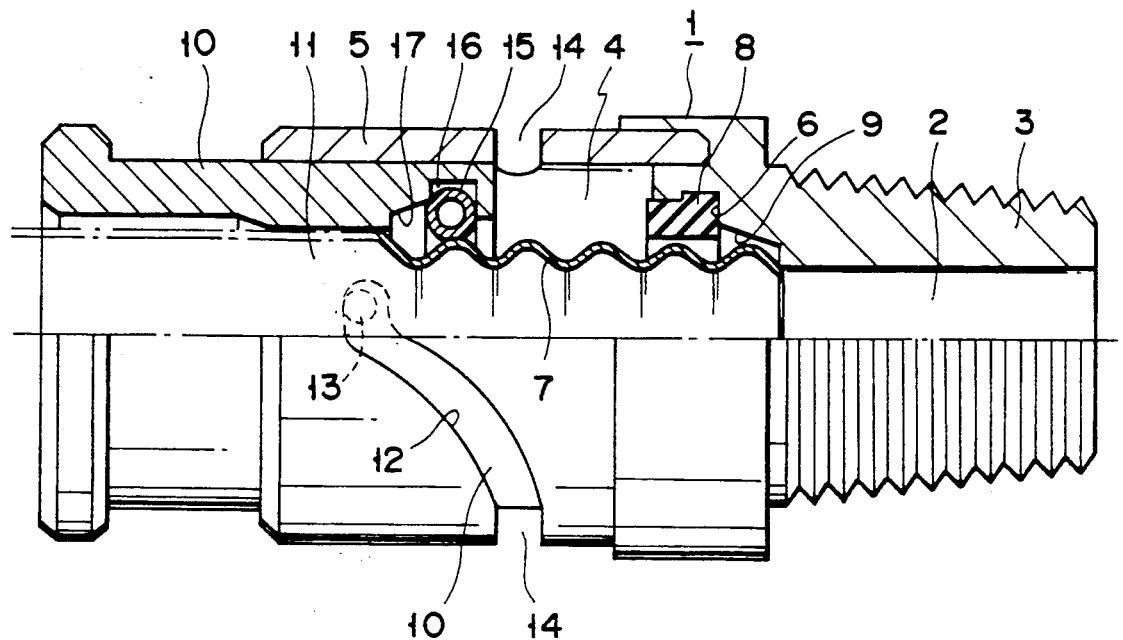
FIG. 1 is a partial longitudinal sectional side view of the first embodiment of the present invention, showing a state wherein a corrugated pipe is inserted.
Figure 2:
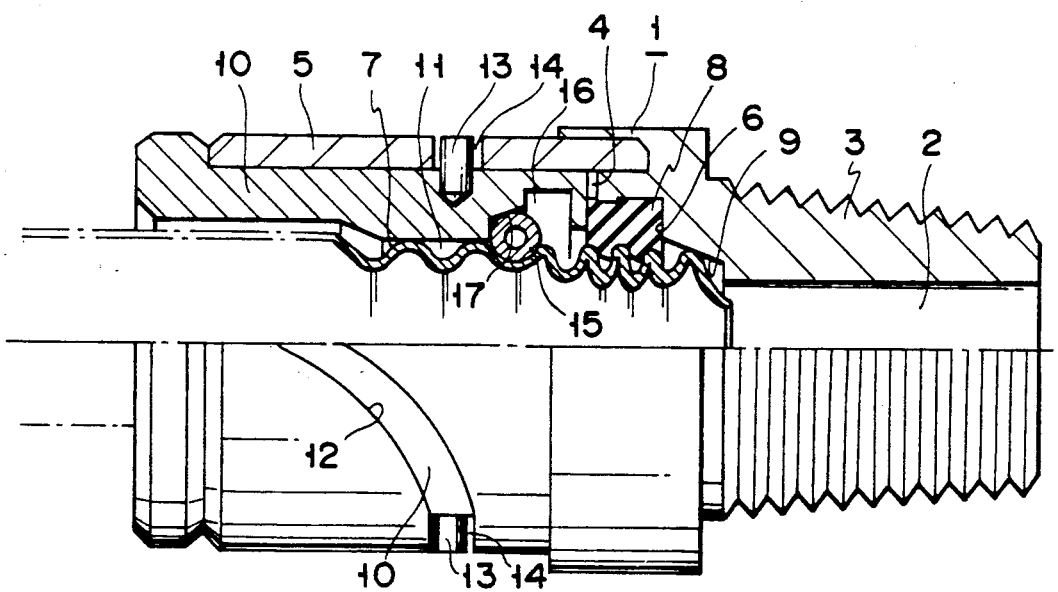
FIG. 2 is a partial longitudinal sectional side view of the first embodiment, showing a state wherein the inserted corrugated pipe is clamped and connected.
Figure 3:
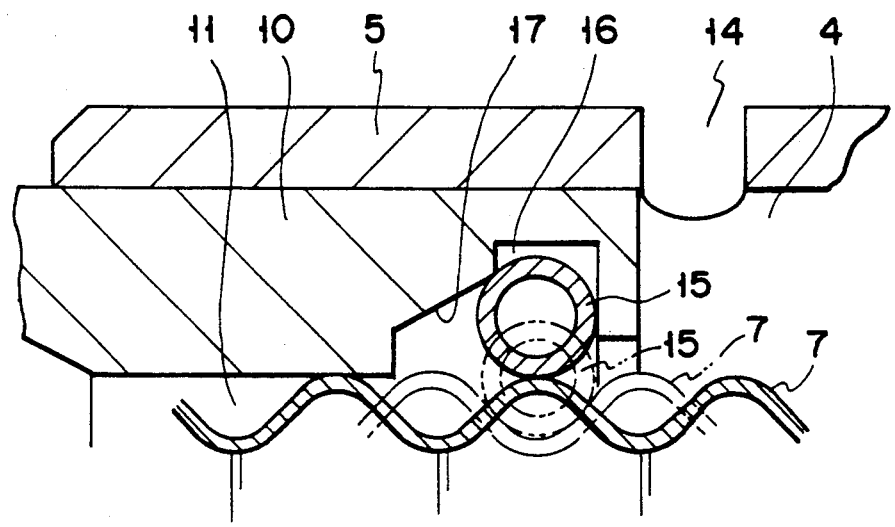
FIG. 3 is an enlarged sectional view showing a state wherein a ring slips in a circumferential groove upon movement over a ridged portion of the corrugated pipe.
Figure 4:
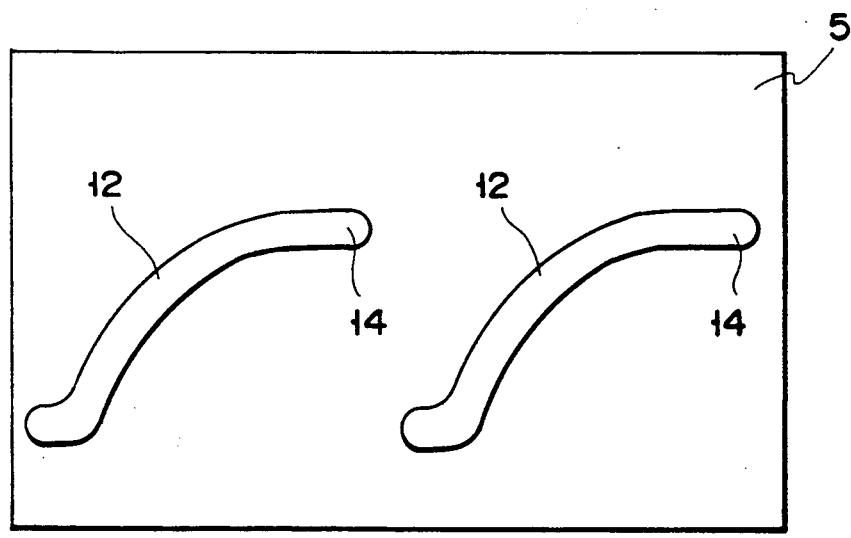
FIG. 4 is an exploded view of a pipe coupling main cylindrical portion having inclined grooves formed therein.

Embodiments of the present invention will be described below with reference to the accompanying drawings.

FIGS. 1 to 4 show the first embodiment of the present invention. Reference numeral 1 denotes a pipe coupling main body which is constituted by a cylindrical portion 3 having a small-diameter through hole 2 therein and a pipe coupling main cylindrical portion 5 having a large-diameter through hole 4 therein. These holes 2 and 4 communicate with each other. In this embodiment, the cylindrical portion 3 and the pipe coupling main cylindrical portion 5 are separately formed. However, they may be formed integrally. A seal ring 8 is fitted in a stepped circumferential groove 6 formed at a connecting portion between the small- and large-diameter holes 2 and 4. The seal ring 8 serves to seal the outer surface of an inserted corrugated pipe 7. A stopper 9 with which the distal end portion of the inserted corrugated pipe 7 is brought into contact is arranged near the stepped circumferential groove 6. The inner surface of the large-diameter through hole 4 is formed into a smooth surface.

Reference numeral 10 denotes an inner cylinder, which is fitted in the large-diameter through hole 4 so as to be slidable in the axial direction and rotatable in the circumferential direction. The inner cylinder 10 has a smooth outer surface and an inner surface defining a through hole 11 corresponding to the outer diameter of the corrugated pipe 7.

The pipe coupling main cylindrical portion 5 having the large-diameter through hole 4 also has an inclined groove formed therein to be inclined with respect to the axis. A pin 13 which is engaged with the inclined groove 12 extends from the outer surface of the inner cylindrical 10. When the inner cylindrical 10 is rotated, the pin 13 is guided by the inclined groove 12 so as to slide in the axial direction with a rotating motion. In order to maintain the final clamping state of a ring to be described later), the inclined groove 12 formed in the pipe coupling main cylindrical portion 5 has a straight groove 14 formed at its end portion and extending along the circumferential direction of the main cylindrical portion 5.

An annular groove 16 is formed in the inner surface of the inner cylinder 10. A metal ring 15 (see FIG. 7) is fitted in the annular groove 16. The metal ring 15 is constituted by a coil spring which can be engaged with a ridged portion of the outer surface of the corrugated pipe 7. A tapered surface 17 is formed on a portion of the annular groove 16 so as to urge the metal ring 15, which is fitted in the groove 16, obliquely with respect to the central direction, and to cause the metal ring 15 to axially depress a corrugation of the outer surface (corrugated surface) of the corrugated pipe 7 inserted in the inner cylinder 10.

Note that a metal ring 15' shown in FIG. 8 may be used in place of the metal ring 15. This metal ring 15' is designed such that a portion of the circular ring is cut by a predetermined length W so as to allow the ring to have a reduced circumferential length. With this structure, when an urging force is applied to the ring 15' in the centrifugal direction, an inner diameter R can be reduced without changing a wire diameter r. With this reduction, the corrugation of the outer surface of the corrugated pipe is urged in the axial direction, and the corrugation is depressed by the metal ring 15'.

An operation of the first embodiment of the present invention will be described below.

When the inner cylinder 10 fitted in the large-diameter through hole 4 of the pipe coupling main cylindrical portion 5 is rotated, the pin extending from the inner cylinder 10 is guided by the inclined groove 12 formed in the main cylindrical portion 5 and is moved forward or backward in the axial direction with a rotating motion.

When the corrugated pipe 7 is to be connected, the inner cylinder 10 is rotated to be moved in a direction to be separated from the small-diameter through hole 2 (to the left in FIG. 1). In this state, the corrugated pipe 7 is inserted into the inner cylinder 10. At this time, the metal ring 15 fitted in the annular groove 16 formed in the inner surface of the inner cylinder 10 is expanded by the ridged portions of the corrugated pipe 7 in the centrifugal direction so as to allow insertion of the corrugated pipe 7 (see FIG. 3). The corrugated pipe 7 is kept inserted until its distal end portion is engaged with the stopper 9 formed near the stepped circumferential groove 6 between the small-and large-diameter through holes 2 and 4. When the distal end portion of the corrugated pipe 7 is engaged with the stopper 9, the inner cylinder 10 is rotated by using a proper tool such as a wrench. With the rotation of the inner cylinder 10, the metal ring 15 fitted in the annular groove 16 is urged by the tapered surface 17 and is enaged with a furrowed portion of the corrugated pipe 7. When the inner cylinder 10 is further slid in the axial direction, the ring 15 engaged with the furrowed portion of the corrugated pipe 7 is urged by the tapered surface 17 in the central direction and is moved. As a result, the ring 15 urges the furrowed portion of the corrugated pipe 7. Meanwhile, the corrugated pipe 7, the distal end portion of which is locked by the stopper 9, is urged by the moving metal ring 15, and the corrugation of the outer surface of the corrugated pipe 7 is axially depressed. On the other hand, the metal ring 15 is tightly clamped between the furrowed portion and the tapered surface 17. Therefore, when the pin 13 on the inner cylinder 10 side reaches the straight groove 14 of the inclined groove 12 on the main cylindrical portion 5 side, the corrugated pipe 7 is completely connected to the inner cylinder 10 and is not removed therefrom.

The outer surface of the distal end portion of the corrugated pipe 7, which is inserted and connected in/to the inner cylinder 10 in the above-described manner, is subjected to so-called side-surface sealing by means of the seal ring 8.

Figure 5:
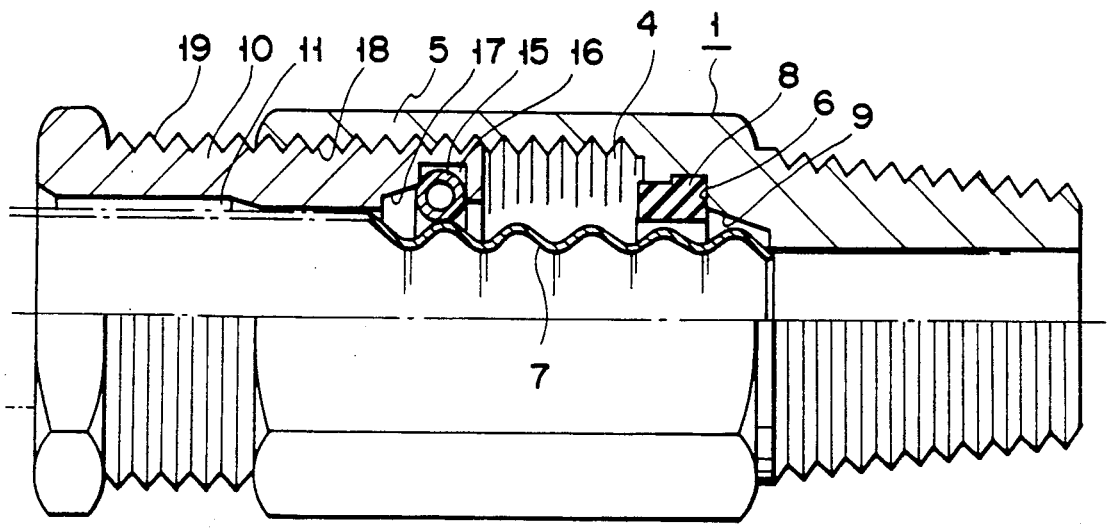
FIG. 5 is a partial longitudinal sectional side view of the second embodiment of the present invention, showing a state wherein a corrugated pipe is inserted.
Figure 6:
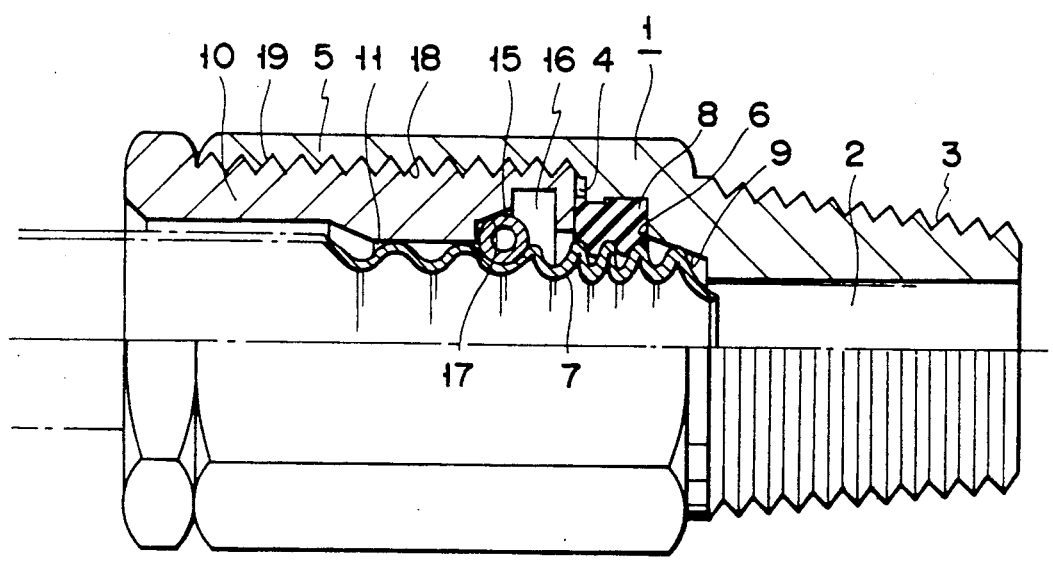
FIG. 6 is a partial longitudinal sectional side view of the second embodiment, showing a state wherein the inserted corrugated pipe is clamped and connected.

FIGS. 5 and 6 show the second embodiment of the present invention. The same reference numerals in the second embodiment denote the same parts as in the first embodiment, and a description thereof will be omitted.

The second embodiment differs from the first embodiment in a coupling means between a pipe coupling main cylindrical portion 5 and an inner cylinder 10. More specifically, internal and external threads 18 and 19 are respectively formed in the inner and outer surfaces of the pipe coupling main cylindrical portion 5 and the inner cylinder 10 so as rotatably and slidably couple the inner cylinder 10 to the main cylindrical portion 5. That is, the main cylindrical portion 5 and the inner cylinder 10 are coupled to each other by threadable engagement.

In the second embodiment, therefore, if the inner cylinder 10 is rotated in a direction to be inserted into the pipe coupling main cylindrical portion 5, similar to the first embodiment, a corrugation of a corrugated pipe 7 is depressed by a metal ring 15, and connection between the pipe coupling and the corrugated pipe 7 is completed. If the inner cylinder 10 is rotated in the reverse direction, the metal ring 15 releases the corrugated pipe 7 so as to allow it to be easily pulled off from the inner cylinder 10.

In the second embodiment, a lock nut may be fitted on the outer surface of the inner cylinder 10. With this structure, after connection of the corrugated pipe 7 is completed in the above-described manner, the lock nut is urged against the end face of the pipe coupling main cylindrical portion 5 in order to more reliably prevent loosening of the inner cylinder 10.

Figure 9:
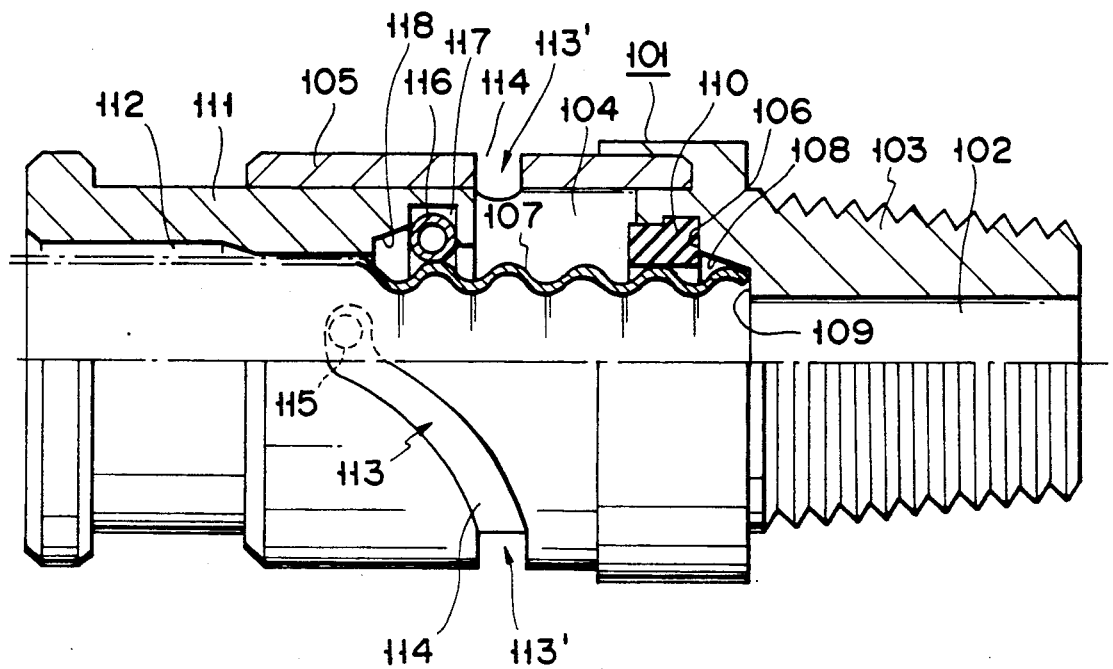
FIG. 9 is a partial longitudinal sectional side view of a pipe coupling according to the third embodiment of the present invention, showing a state wherein a corrugated pipe is inserted.
Figure 10:
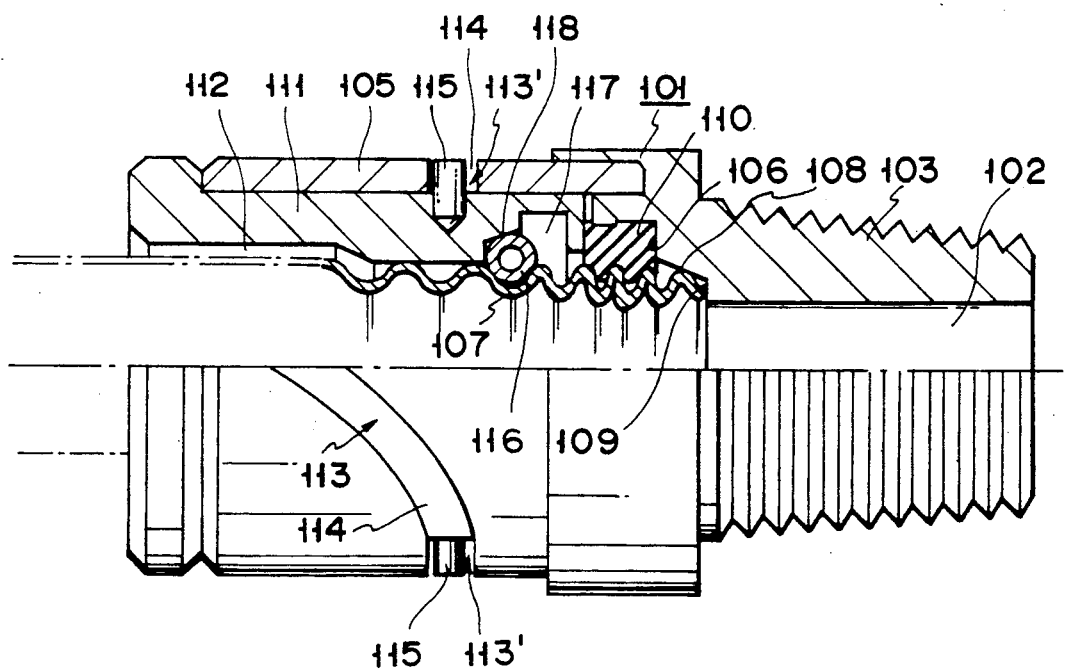
FIG. 10 is a partial longitudinal sectional side view showing a state wherein the inserted corrugated pipe is clamped and connected.
Figure 11:
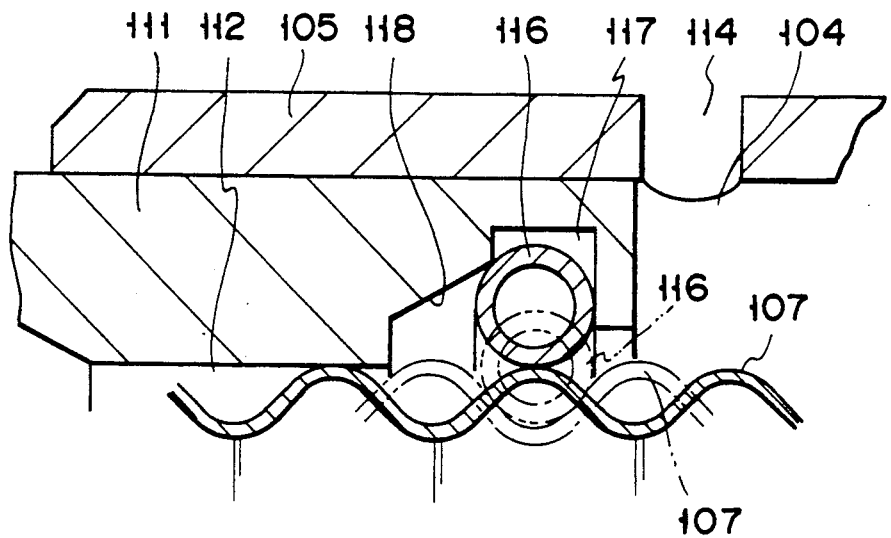
FIG. 11 is an enlarged sectional view showing a state wherein a metal ring slips in the centrifugal direction upon movement over a ridged portion of the corrugated pipe.

The third embodiment of the present invention will be described below with reference to FIGS. 9 to 12. Referring to FIG. 9, reference numeral 101 denotes a pipe coupling main body including a cylindrical portion 103 having a small-diameter through hole 102 therein, and a pipe coupling main cylindrical portion 105 having a large-diameter through hole therein. The cylindrical portion 103 and the main cylindrical portion 105 are connected to each other in such a manner that the through holes 102 and 104 communicate with each other. In this embodiment, the cylindrical 103 and the pipe main cylindrical portion 105 are separately formed. However, they may be formed integrally.

A stepped circumferential groove 106, a tapered seal surface 108, and a stopper 109 are formed at a stepped connecting portion between the large- and small-diameter through holes 102 and 104. The tapered seal surface 108 is formed to be adjacent to the stepped circumferential groove 106 so as to seal the outer surface of a distal end portion of a corrugated pipe 107 whose diameter is gradually decreased toward the deep portion of the small-diameter through hole 102. The stopper 109 is arranged next to the tapered seal surface 108. The stopper 109 is brought into contact with the distal end of the corrugated pipe 107 so as to prevent the corrugated pipe 107 from slipping in the axial direction. A seal ring 110 for sealing the outer surface of the corrugated pipe 107 is fitted in the stepped circumferential groove 106.

The inner surface of the large-diameter through hole is formed into a smooth surface. An inner cylinder 111 is fitted in the large-diameter through hole 104 so as to be slidable in the axial direction and rotatable in the circumferential direction. The inner cylinder 111 has a smooth outer surface and a through hole 112 corresponding to the outer diameter of the corrugated pipe 107. The outer surface on the opening end side of the inner cylinder 111 is formed to have a nut-like hexahedral shape or two chamfers to allow easy rotation of the inner cylinder 111.

Figure 12:
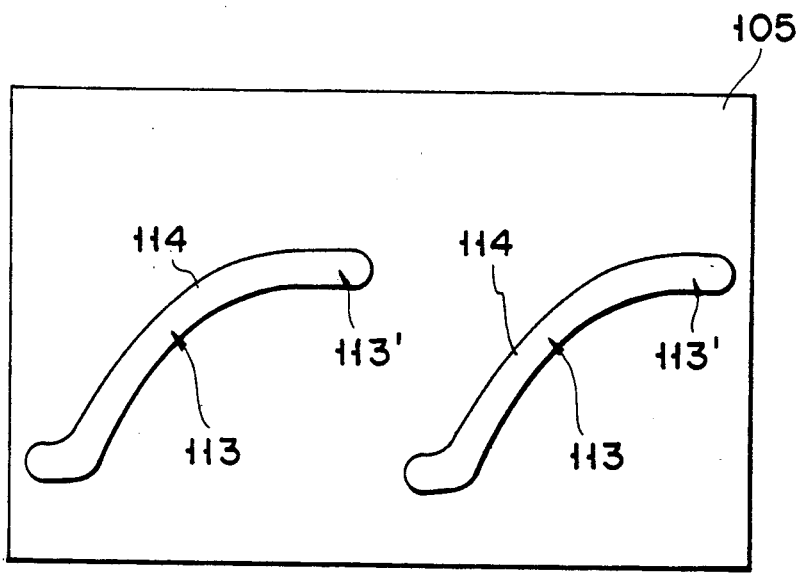
FIG. 12 is an exploded view of a pipe coupling main cylindrical portion, showing the shapes of lock grooves.

Two lock grooves 114 are formed in the pipe coupling main cylindrical portion 105 having the large-diameter through hole 104 at an constant interval, as shown in FIG. 12. Each lock groove 114 comprises a spiral groove 113 inclined with respect to the axis, and a straight groove 113' formed as an extended groove of the groove 113 in the circumferential direction. Pins 115 which are engaged with the inclined grooves 113 extend from the outer surface of the inner cylinder 111. When the inner cylinder 111 is rotated, the pins are guided by the spiral grooves 113 so as to slid in the axial direction with a rotation motion.

Note that the straight grooves 113' serve to maintain the final clamping state of a metal ring (to be described later).

An annular groove 117 is formed in the inner surface of the inner cylinder 111. A metal spiral spring ring (to be referred to as a metal ring hereinafter) 116, which can be engaged with a furrowed portion of the outer surface of the corrugated pipe 107 and expands/contracts in the circumferential direction, is fitted in the annular groove 117. A tapered urging surface 118 is formed on a portion of the annular groove 117 so as to urge the metal ring 116 fitted in the groove 117 obliquely in the central direction and to cause the metal ring 116 to depress a corrugation of the outer surface of the corrugated pipe 107 inserted in the inner cylinder 111.

As described above, the metal ring 116 can expand/contract in the circumferential direction. However, the metal ring 116 is formed to be so firm that upon reception of an urging force the central direction, the metal ring is not reduced in radius, and the coil of the wire material constituting the metal ring is not deformed.

An operation of the third embodiment will be described below.

When the inner cylinder 111 fitted in the large-diameter through hole of the pipe coupling main cylindrical portion 105 is rotated, the pins 115 extending from the inner cylinder 111 are guided by the spiral grooves 113 formed in the main cylindrical portion 105 so as to be moved forward or backward in the axial direction.

When the corrugated pipe 107 is to be connected, the inner cylinder 111 is rotated and moved in a direction to be separated from the small-diameter through hole 102 (to the left in FIG. 9). In this state, when the corrugated pipe 107 is inserted into the inner cylinder 111, the metal ring 116 fitted in the annular groove 117 formed in the inner surface of the inner cylinder 111 is expanded by a ridged portion of the corrugated pipe 107 in the centrifugal direction so as to allow easy insertion of the corrugated pipe 107 (see FIG. 11).

The corrugated pipe 107 is kept inserted until its distal end is brought into contact with the stopper 109 formed near the stepped circumferential groove 106 between the small- and large-diameter through holes 102 and 104. When the distal end of the corrugated pipe 107 is brought into contact with the stopper 109, a proper tool such as a wrench is fitted on the outer surface of the opening end portion of the inner cylinder 111 so as to rotate the inner cylinder 111. With this rotation, the inner cylinder 111 is moved toward the small-diameter through hole 102. Upon this movement, the metal ring 116 fitted in the annular groove 117 is urged by the tapered urging surface 118 and is engaged with a furrowed portion of the corrugated pipe 107.

If the inner cylinder 111 is further rotated and moved in the axial direction, the metal ring 116 which is engaged with the furrowed portion of the corrugated pipe 107 is urged by the tapered urging surface 118 obliquely in the central direction and is moved in the axial direction of the corrugated pipe 107. As a result, the metal ring 116 urges a ridged portion of the corrugated pipe 107. Meanwhile, the corrugated pipe 107, the distal end of which is in contact with and locked by the stopper 109, is urged by the moving metal ring 116, and the ridged portion is gradually depressed in the axial direction. On the other hand, the metal ring 116 is clamped between the furrowed portion and the tapered urging surface 118. Therefore, when the pins 115 on the inner cylinder 111 reach the straight grooves 113' of the lock grooves 114, the pins 115 are locked by the lock grooves 114, and the inner cylinder 111 is not rotated any more. As a result, the corrugated pipe 107 is completed connected and is not removed from the inner cylinder 111. When the corrugation of the outer surface of the corrugated pipe 107 is depressed and a complete connecting state is established in this manner, the tapered seal surface 108 of the connecting stepped portion is brought into tight contact with the outer surface of the distal end portion of the corrugated pipe 107, thus ensuring metal sealing. This metal sealing is very firm and becomes firmer upon thermal expansion due to a temperature rise.

In addition, the outer surface of the connected corrugated pipe 107 is also sealed by a seal ring 110 fitted in the connecting stepped portion.

When the corrugated pipe 107 is to be disconnected, the inner cylinder 111 is rotated in the reverse direction and moved in a direction to be separated from the small-diameter through hole 102. With this operation, the urging force of the tapered urging surface 118 against the metal ring 116 is reduced to release the metal ring 116. When the metal ring is completely released, the corrugated pipe 107 can be easily pulled off from the inner cylinder 111.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A pipe coupling for a corrugated pipe having a plurality of ridged portions and furrowed portions, comprising:
   (a) a pipe coupling main body including
   a first cylindrical portion having a small-diameter through hole,
   a second cylindrical portion having a large-diameter through hole,
   a connecting stepped portion formed between the small- and large-diameter through holes and having a circumferential groove formed therein, with an annular seal ring fitted in said circumferential groove,
   stopper means, formed in said connecting stepped portion, for engaging an end portion of the corrugated pipe;
   (b) an inner cylinder including an inner surface defining a through hole with a diameter substantially equal to an outer diameter of the corrugated pipe and an annular groove having a rearwardly and radially inwardly extending tapered portion formed in said inner surface, said inner cylinder and said second cylindrical portion having cooperating means therebetween when said inner cylinder is engaged in the large-diameter through hole of said second cylindrical portion for axial movement of said inner cylinder toward and away from said seal ring; and
   (c) a radially expandable and compressible metal ring arranged in said annular groove of said inner cylinder, said metal ring being expandable into said annular groove by said ridged portions upon insertion of a distal end of the corrugated pipe into said inner cylinder, and after the distal end of the corrugated pipe engages said stopper means, said metal ring is engageable in a furrowed portion of the corrugated pipe and radially compressible by said tapered portion upon axial movement of said inner cylinder toward said seal ring, said metal ring being operable to urge the distal end portion of the corrugated pipe into peripheral side surface sealing engagement with aid seal ring when said inner cylinder is fully inserted within said large diameter through hole.

2. The pipe coupling according to claim 1, wherein said cooperating means includes;
   a pin extending from an outer surface of said inner cylinder; and
   an inclined groove, formed in said second cylindrical portion, for guiding said pin to cause said inner cylinder to rotate in the circumferential direction and move in the axial direction;
   said inclined groove having a straight groove, extending along the circumferential direction of said second cylindrical portion, for maintaining said metal ring clamped between said tapering portion and the furrowed portion of the corrugated pipe.

3. A pipe coupling for a corrugated pipe having a plurality of axially alternating ridged portions and furrowed portions, comprising:
   (a) a pipe coupling main body including
   a first cylindrical portion having a small-diameter through hole,
   a second cylindrical portion having a large-diameter through hole,
   a connecting stepped portion formed between the small- and large-diameter through holes, said connecting stepped portion having a circumferential groove formed therein,
   a tapered seal surface formed adjacent to the circumferential groove and gradually reduced in diameter in a pipe insertion direction,
   an annular stop surface formed adjacent to said tapered seal surface and engageable with a distal end of the corrugated pipe so as to prevent the corrugated pipe from slipping in an axial direction thereof, and
   a seal ring, fitted in said circumferential groove, for sealing an outer surface of the corrugated pipe;
   (b) an inner cylinder including a forward end insertable within said second cylindrical portion for axial movement toward and away from said seal ring, said inner cylinder having
- a through hole defined by an inner surface of said inner cylinder with a diameter substantially equal to an outer diameter of the corrugated pipe, and an inner annular groove formed at said forward end of said inner cylinder, and
- a tapered portion formed on said inner surface adjacent to the annular groove, said inner cylinder being fitted in the large-diameter through hole of said pipe coupling main body so as to be movable in the axial direction and rotatable, said large-diameter through hole and said inner cylinder having cooperating means for retaining said inner cylinder within said large-diameter through hole and for axial movement of said inner cylinder toward and away from said seal ring; and (c) a radially expandable and compressible metal ring arranged in the circumferential groove of said inner cylinder, said metal ring being radially expandable by engagement with said ridged portions of said corrugated pipe, and radially compressible by engagement with said tapered portion when said metal ring is seated in one of said furrowed portions and said inner cylinder is moved axially toward said seal ring;

wherein after said distal end of the corrugated pipe is in engagement with said annular stop surface, and when said pipe coupling main body and said inner cylinder are completely coupled to each other, said metal ring is compressed by an urging force of said tapered surface obliquely in a central direction so as to axially depress said distal end portion of the corrugated pipe and to thereby cause said distal end portion to sealingly engage said seal ring.

4. The pipe coupling according to claim 3, wherein said cooperating means includes:
- a pin extending from an outer surface of said inner cylinder; and
- an inclined groove, formed in said second cylindrical portion, for guiding said pin to cause said inner cylinder to rotate in the circumferential direction and move in the axial direction;
- said inclined groove having a straight groove, extending along the circumferential direction of said second cylindrical portion, for maintaining said metal ring clamped between said one furrowed portion and said tapered portion.

5. The pipe coupling according to claim 3, wherein said cooperating means includes threads on second cylindrical portion and said inner cylinder whereby said second cylindrical portion and said inner cylinder are threadably engaged with each other.

* * * * *